United States Patent [19]

Fischer

[11] Patent Number: 4,815,904
[45] Date of Patent: Mar. 28, 1989

[54] DRILLING ASSEMBLY FOR MAKING BOREHOLES WITH UNDERCUTS

[75] Inventor: Artur Fischer, Waldachtal/Tumlingen, Fed. Rep. of Germany

[73] Assignee: fischerwerke Artur Fischer GmbH & Co., KG, Tumlingen, Fed. Rep. of Germany

[21] Appl. No.: 174,094

[22] Filed: Mar. 28, 1988

[30] Foreign Application Priority Data

Apr. 8, 1987 [DE] Fed. Rep. of Germany ....... 3711903

[51] Int. Cl.$^4$ .............................................. B23C 1/00
[52] U.S. Cl. ..................................... 409/190; 175/170; 408/150
[58] Field of Search ....................... 409/190; 408/150; 175/170

[56] References Cited

U.S. PATENT DOCUMENTS 4,487,275 12/1984 Froehlich ............................ 408/150

Primary Examiner—Léon Scott, Jr.
Attorney, Agent, or Firm—Michael J. Striker

[57] ABSTRACT

A drilling assembly for making boreholes with undercuts comprises a housing receiving a drill receiver driven by a drilling machine, a drill, the shaft of which is connected to the drill receiver, and a sleeve-shaped centering insert protruding from the housing and surrounding the shaft of the drill with a play and having a conical portion the outer diameter of which increases towards the housing.

6 Claims, 1 Drawing Sheet

DRILLING ASSEMBLY FOR MAKING BOREHOLES WITH UNDERCUTS

BACKGROUND OF THE INVENTION

The present invention relates to a drilling assembly for producing boreholes having undercut or enlarged portions.

Drilling assemblies of the type under discussion have been known. One of such assemblies has been disclosed in the German Patent DE-PS No. 3,037,408. The drilling assembly disclosed in this patent enables, in a simple fashion, the drilling of bores having an undercut at the base of the bore by pivoting the drill after the latter has reached a desired depth of the bore. The pivotable support of the drill receiver makes it possible to pivot the drill at the predetermined depth of the bore such that the drill head reames or countersinks conically the borehole base. Special anchoring elements may be inserted in the borehole formed in such a manner. These anchoring elements can spread out in the region of the borehole base so that a form-locking connection between the anchoring element and the wall of the borehole takes place.

Known drilling assemblies are utilized particularly for making boreholes in masonry of concrete. The head of the drill which has a greater diameter than that of the drill shank or shaft is subject to higher wear, whereby with increasing operation duration the diameter of the drill head is reduced and thus the boreholes produced thereby become of smaller diameter. A centering attachment provided on and extending outwardly from the housing of the conventional drilling assembly is adjusted in its outer diameter to a minimal borehole diameter produced. This results in that the centering attachment, particularly when a new drill is utilized, which produces the borehole of a greater diameter, is not able to precisely center the drill in the borehole. Thus countersinking or reaming the undercut is made quite difficult.

SUMMARY OF THE INVENTION

It is an object of the present invention to provide an improved drilling assembly.

It is another object of the invention to provide a drilling assembly for drilling boreholes with undercuts, the centering attachment of which would ensure a reliable centering with many drills utilized.

These and other objects of the invention are attained by a drilling assembly for producing boreholes having undercuts, comprising a housing; a drill receiver drivable from a percussion drilling machine; a drill including a drill head and a shaft connected to said drill receiver and being of a smaller diameter than said head; and a centering insert partially inserted in said housing and having a sleeve-shaped portion protruding outwardly from said housing, said centering insert pivotally supporting said drill receiver, said sleeve-shaped portion surrounding said shaft with a play, said sleeve-shaped portion of said centering insert having at an end thereof, which faces away from said drill head, a conical zone which has an outer diameter which increases toward said housing.

Due to the provision of the conical zone or portion in the centering insert or attachment of the drilling assembly according to the invention, the drill can be always centered in the borehole even with insignificantly varying borehole diameters caused for example by a reduced drill head diameter due to wear. The outer diameter of the conical zone increases from the smallest diameter to the greatest diameter in the ratio of 5 to 15%.

In order to avoid clamping of the conical zone in the borehole being produced, this zone can be subdivided into a plurality of segments disposed over the periphery of the conical zone or, alternatively, this zone may be provided with a knurling. With relatively small or narrow boreholes, such a knurled or multi-part conical zone is continually inserted into the borehole due to vibrations of the drilling assembly until the housing of the assembly lies against the wall surrounding the mouth of the borehole. Thereby the knurling would withstand to a strong pressing of the centering attachment in the borehole because the knurling with its rough outer surface in connection with vibrations imparted to the drilling assembly by the percussion drilling machine would ream a space required for the conical zone. If such a reaming does not take place in the region of the conical zone automatically a slight stroke or rotation impulse on the drill assembly would be able to release the knurling from the borehole. Thereby a desired undercut at the base of the borehole is always positioned exactly at the required depth and the housing of the drilling assembly during the reaming process is always in a required position.

Furthermore, if the housing should perform a pivoting motion required for the reaming process the drill receiver should be fixed as firmly as possible. To fulfill this requirement, it is proposed herein to form the housing with a bearing surface projecting in the direction towards said drill head and being radially spaced from said centering insert.

Said annular surface may be ring-shaped and, during the reaming of the undercut, lies on the wall of masonry.

The radial spacing between the ring-shaped or annular bearing surface of the housing and the centering insert is particularly advantageous because, often, the material in the region of the mouth of the borehole breaks away from the masonry so that no flat surface is available in the immediate surrounding of the mouth of the borehole. The aforementioned bearing surface lies on the wall at the distance from the borehole whereby a reliable support or bearing of the drilling assembly on the wall of the masonry is ensured.

The outer diameter of said conical zone may increase from a minimal diameter to a maximal possible diameter of said drill head in correspondence with a predetermined diameter of a borehole being produced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
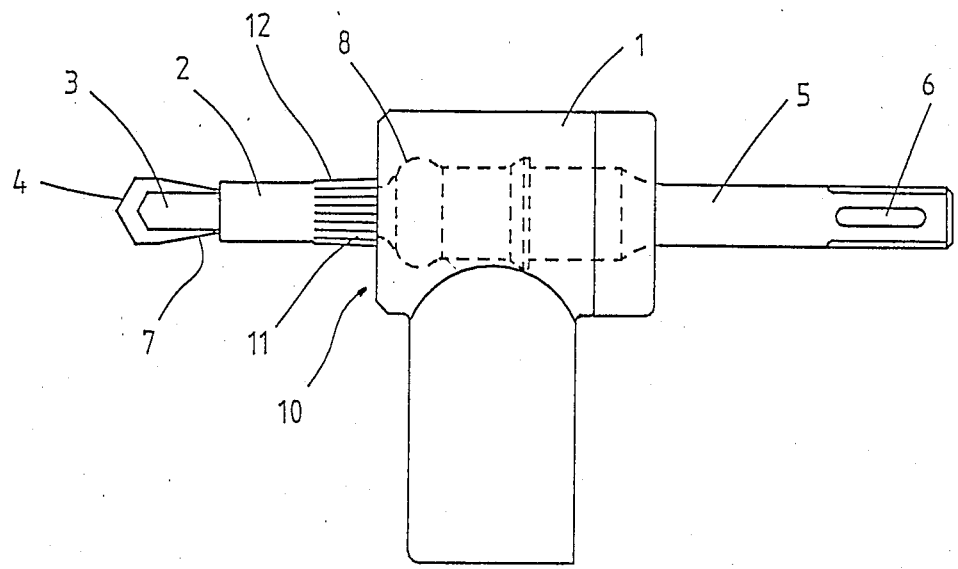
FIG. 1 is a side view of the drilling device of the ivention.

Referring now to the drawings in detail, it will be seen that the drilling device of the present invention is comprised of a housing 1, a centering insert or attachment 3, a drill 3 having a drill head 4 and a drill receiver 5. The latter has a shaft 6 which is driven in the known fashion by a percussion drilling machine.

Drill 3 has a shaft 7 which extends through a sleeve-shaped centering insert 2 into housing 1 in which the drill shaft 7 is threaded to the drill receiver 5.

The portions of drill receiver 5 and drill 3 positioned inside the housing 1 are shown by dotted lines in FIG. 1. The drill receiver 5 has at its portion facing the drill a ball-shaped surface 8 which, in cooperation with a respectively-shaped bearing surface 9 seen in FIG. 2, forms a pivot bearing for the drill receiver 5. A possible structure of such pivot bearing has been disclosed in the aforementioned patent and does not constitute the present invention.

Figure 2:
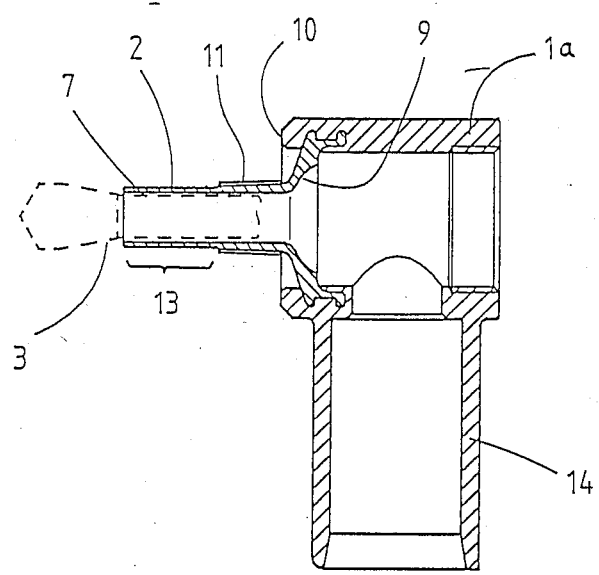
FIG. 2 is a sectional view of the housing of the drilling device with a centering attachment of FIG. 1.

Referring now to FIG. 2, it is seen that the centering insert 2 is inserted in the housing 1 so that the bearing surface 10 forms on housing 1 an annular end face which is radially spaced from a conical zone or portion 11 of the centering insert 2. Conical portion 11 is provided with knurling 12 whereas the remaining cylindrical portion 13 of the centering insert 2 has a smooth outer surface and a uniform outer diameter over the entire length of portion 13. The conical zone 11 may be multi-part, e.g. made of a number of segments. The outer diameter of the conical portion 13 increases towards the housing 1. Shaft 7 of drill 3 is positioned in the centering insert 13 with a radial play whereby drill 3 can pivot in the borehole base for countersinking an undercut portion of the borehole.

Housing 1 includes a cylindrical portion which receives the ends of the centering insert, the drill and the drill receiver as explained hereinabove and a tubular attachment 14 which extends downwardly of the cylindrical portion of the housing 1. A suction device for the suction of drilled dust can be connected in the known fashion to the tubular attachment 14.

It will be understood that each of the elements described above, or two or more together, may also find a useful application in other types of drilling assemblies for making boreholes with undercuts differing from the types described above.

While the invention has been illustrated and described as embodied in a drilling assembly for making boreholes with undercuts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A drilling assembly for producing boreholes having undercuts, comprising a housing; a drill receiver drivable from a percussion drilling machine; a drill including a drill head and a shaft connected to said drill receiver and being of a smaller diameter than said head and a centering insert partially inserted in said housing and having a sleeve-shaped portion protruding outwardly from said housing, said centering insert pivotally supporting said drill receiver, said sleeve-shaped portion surrounding said shaft with a play, said sleeve-shaped portion of said centering insert having at an end thereof, which faces away from said drill head, a conical zone which has an outer diameter which increases toward said housing.

2. The assembly as defined in claim 1, wherein said conical zone is comprised of a plurality of segments distributed over a peripheral surface thereof.

3. The assembly as defined in claim 1, wherein said conical zone has a knurling thereon.

4. The assembly as defined in claim 1, wherein the outer diameter of said conical zone increases from a minimal diameter to a maximal possible diameter of said drill head in correspondence with a predetermined diameter of a borehole being produced.

5. The assembly as defined in claim 1, wherein said housing is formed with a bearing surface projecting in the direction towards said drill head and being radially spaced from said centering insert.

6. The assembly as defined in claim 5, wherein said annular surface is ring-shaped.

* * * * *